United States Patent
Smith et al.

(10) Patent No.: US 9,264,148 B2
(45) Date of Patent: *Feb. 16, 2016

(54) TWO DIMENSIONAL PHOTONIC CLUSTER STATE GENERATOR FROM SEQUENTIAL PHOTONS WITH MULTIPLE ENTANGLEMENT GATES

(71) Applicant: THE UNITED STATES OF AMERICA AS REPRESETNED BY THE SECRETARY OF THE AIR FORCE, Washington, DC (US)

(72) Inventors: Amos M. Smith, Rome, NY (US); Michael L. Fanto, Rome, NY (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 181 days.

This patent is subject to a terminal disclaimer.

(21) Appl. No.: 14/164,651

(22) Filed: Jan. 27, 2014

(65) Prior Publication Data

US 2015/0077821 A1    Mar. 19, 2015

Related U.S. Application Data

(60) Provisional application No. 61/879,698, filed on Sep. 19, 2013.

(51) Int. Cl.
| | |
|---|---|
| *H04B 10/70* | (2013.01) |
| *G02F 1/035* | (2006.01) |
| *G02B 6/12* | (2006.01) |
| *G06N 99/00* | (2010.01) |
| *G02F 1/225* | (2006.01) |
| *G02F 1/313* | (2006.01) |
| *G02F 1/21* | (2006.01) |
| *H04L 9/08* | (2006.01) |

(52) U.S. Cl.
CPC ............. *H04B 10/70* (2013.01); *G02F 1/225* (2013.01); *G02F 1/3136* (2013.01); *G06N 99/002* (2013.01); *G02F 2001/217* (2013.01); *G02F 2201/20* (2013.01); *H04L 9/0852* (2013.01)

(58) Field of Classification Search
None
See application file for complete search history.

(56) References Cited

U.S. PATENT DOCUMENTS

| | | | | |
|---|---|---|---|---|
| 8,995,797 B2* | 3/2015 | Smith | .......... | G02B 6/105 385/11 |
| 9,075,282 B2* | 7/2015 | Smith | .......... | G02F 1/225 |
| 9,077,457 B1* | 7/2015 | Smith | .......... | H04B 10/70 |
| 9,083,473 B1* | 7/2015 | Smith | .......... | H04B 10/70 |
| 2015/0261058 A1* | 9/2015 | Silverstone | .......... | G02F 1/225 385/3 |

* cited by examiner

*Primary Examiner* — Hemang Sanghavi
(74) *Attorney, Agent, or Firm* — Joseph A. Mancini

(57) ABSTRACT

We describe an integrated waveguide device that creates entanglement between a sequence of periodically spaced (in time) photons in a single input and output mode. The device consists of a polarization maintaining integrated waveguide chip containing a number of delay lines, integrated multi-mode interferometers with the potential for rapid switching, a polarization controller and off chip computer logic and timing. The device is capable of creating a diverse array of outputs such as linear cluster states and ring cluster states in a single output mode.

14 Claims, 1 Drawing Sheet

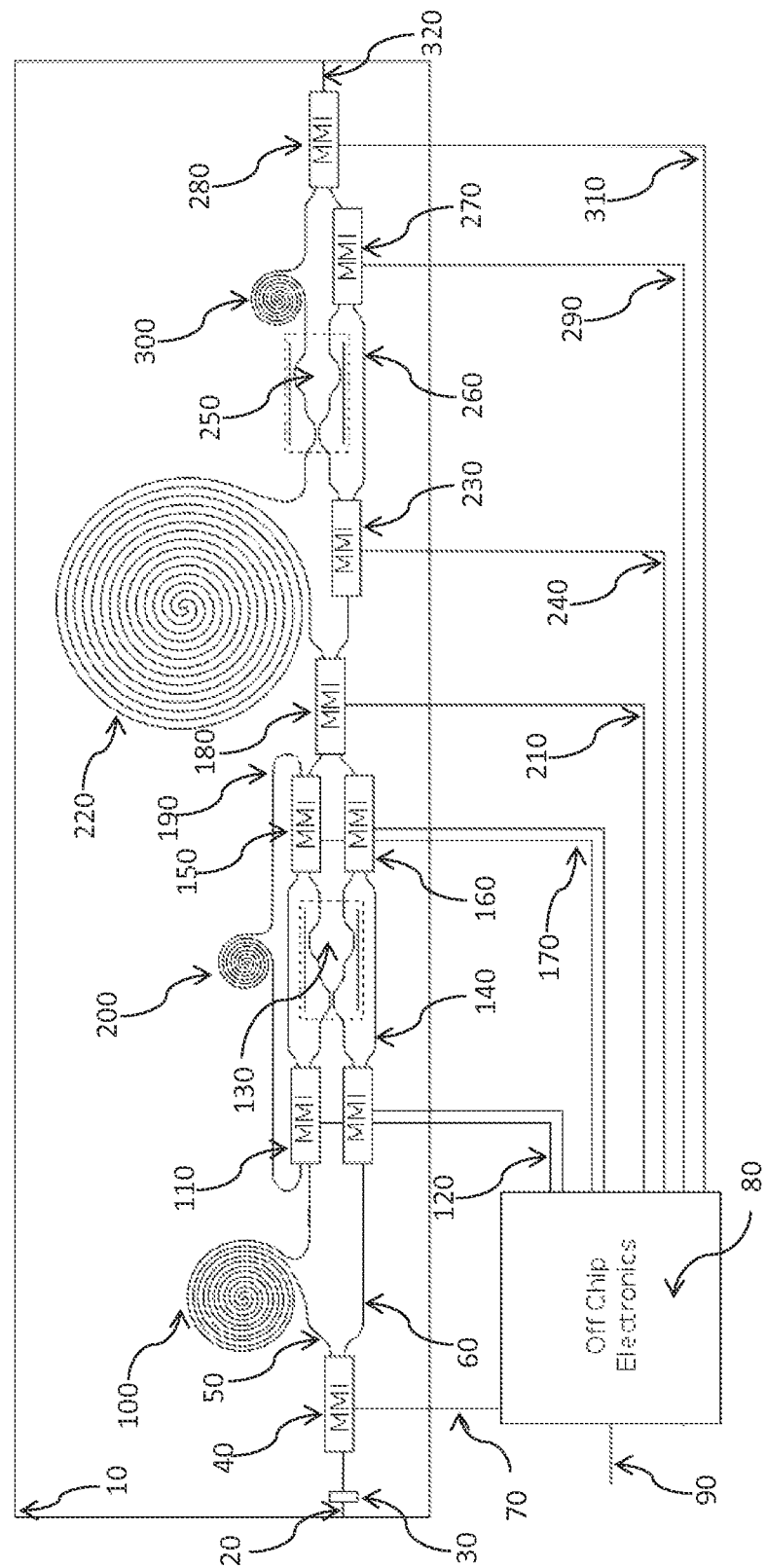

TWO DIMENSIONAL PHOTONIC CLUSTER STATE GENERATOR FROM SEQUENTIAL PHOTONS WITH MULTIPLE ENTANGLEMENT GATES

PRIORITY CLAIM UNDER 35 U.S.C. §119(e)

This patent application claims the priority benefit of the filing date of provisional application Ser. No. 61/879,698, having been filed in the United States Patent and Trademark Office on Sep. 19, 2013 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

A cluster state can be loosely defined as an entangled set of qubits arranged in a lattice. Breigel and Raussendorf strictly define a cluster state as "Let each lattice site be specified by a d-tuple of (positive or negative) integers $a \in Z^d$. Each site has 2d neighboring sites. If occupied they interact with the qubit a". This implies that a cluster state has interactions between all nearest neighbor qubits. In one dimensions (d=1) this results in a linear chain of qubits, of arbitrary length with each qubit connected to both of its nearest neighbors. All of the internal qubits will have two interactions while the end qubits will have one. Such a one dimensional nearest neighbor cluster state has been shown to be capable of several interesting applications, presuming the cluster state is "long" enough. Of more interest are two dimensional cluster states which have been shown to be a universal resource for quantum computation, if the cluster state is "large" enough. Even for small systems, two dimensional cluster states are more desirable as they are able to implement more diverse and complex calculations.

Traditional generation of a cluster state consists of an optical table several meters on each side. On this table is a high power pump laser system such as a pulsed Ti:Sapphire laser. The pump beam is incident on a nonlinear material such as BBO, BiBO or PPKTP etc. The photons from the pump then have a small chance to undergo Spontaneous Nonlinear Parametric Down Conversion (SPDC) to create an entangle pair of photons, called signal and idler photons. Alternative means of photon generation are equally valid such as four wave mixing (FWM).

To create larger clusters the pump passes through multiple nonlinear materials (a cascade configuration) or is reflected back onto the material (a multi-pass configuration). These methods can create multiple simultaneous independent pairs of qubits. To create one large cluster state the pairs are sent through (i.e. acted on by) an entangling operation. Normally the controlled phase gate (CPhase) or equivalently controlled Z gate (CZ) is used in the state of the art. The simplest and most efficient means of implementing the general CZ gate requires 3 bulk optical asymmetric beam splitters in a specific alignment. These operations are effectively performed in parallel with each qubit entering and exiting in its own port and the order of the operations is irrelevant if CZ is used. Once all the entangling operations are successfully completed the cluster state is fully constructed and any Measurement Based Quantum Computing (MBQC) algorithm can be implemented as a sequence of single qubit rotations and measurements on each qubit in a predetermined sequence. In the state of the art, cluster states are created from simultaneously generated qubits in parallel modes rather than from sequential qubits in a single mode. This is in large part due to the spontaneous nature of single photon sources. It is impossible to predict the time between two subsequent spontaneous events.

OBJECTS AND SUMMARY OF THE INVENTION

Briefly stated, the present invention proposes to add additional capability to the Sequential Entangler (SE) of Smith and Fanto (U.S. patent application Ser. No. 14/013,355) such that two dimensional cluster states can be created from a sequence of periodic photons in a single mode. The present invention comprises an integrated waveguide device that creates entanglement between a sequence of periodically spaced (in time) photons in a single input and output mode. The device consists of a polarization maintaining integrated waveguide chip containing a number of delay lines, integrated multimode interferometers with the potential for rapid switching, a polarization controller and off chip computer logic and timing. The device is capable of creating a diverse array of outputs such as linear cluster states and ring cluster states in a single output mode.

In a preferred embodiment of the present invention, an apparatus for sequentially entangling photons in two dimensions, the invention comprises a waveguide chip having integrated optical components and interconnecting optical waveguide disposed therein, where the optical components further comprise an input port connected to the optical waveguide for inputting photons into the waveguide chip; a polarization controller connected to the input port for rotating the polarization of the input port; a plurality of delay lines for synchronizing the photons in time; a plurality of multimode interferometers for selectably routing the photons through any of the interconnecting optical waveguide; a controller for switching the input mode of any of the plurality of multimode interferometers so as to route the photons into and out of a selected interferometer's input and output ports; a clock source for synchronizing the controller with the arrival of the photons; a plurality of entangling gates having bypass and entangling inputs and bypass and entangling outputs for selectively entangling photons; and an output port for routing the entangled photons out of the waveguide chip.

The present invention builds upon the periodic photon source of Mower and Englund (WO2013009946A1) to create entanglement between sequential separable qubits delivered in a single mode and create linear and two dimensional cluster states from sequential qubits which are then output in a single mode. Such a device is of interest in and of itself for quantum computing. Applications include but are not limited to the MBQC implementation of Grover's algorithm on a 4 qubit (square) cluster state, quantum key distribution and quantum chemistry. Such experiments could be performed in a single mode with a single detector given a high speed adjustable rotation device. This represents a significant improvement as photon detection remains a difficult and expensive prospect.

The present invention takes the "loop back" feature of the sequential entangler and adds a second larger "loop back" after the entangling operation. These loops are independently controllable. In the preferred embodiment the second larger "loop back" allows for a photon which is already entangled with its nearest neighbors to be looped back so that it can be entangled with a non-nearest neighbor. This effectively creates a two dimensional cluster state which is "flattened" into a single mode. The preferred embodiment uses polarization maintaining waveguides and polarization maintaining integrated devices such as multi-mode interferometers (MMI) and assume that a periodic source of single photons, with period T, is available similar to Smith and Fanto (U.S. patent application Ser. No. 14/013,355).

The present invention creates the entanglement between sequential qubits by using the "loop back" element that delays one photon for one period T of the sequence thus allowing for two sequential photons to be acted on by a standard entangling operation. The preferred embodiment uses the polarization encoded CZ gate of Crespi et. al (WO2012150568A1). After the CZ gate ne photon (now entangled so which photon cannot be distinguished) is then released and the second is "looped back" to coincide with the arrival of the next photon and so on. This probabilistically produces a linear cluster state identical to the Sequential Entangler of Smith and Fanto (U.S. patent application Ser. No. 14/013,355). The term "probabilistically" is used as the state of the art standard CZ gate has a success rate of $\frac{1}{9}$. Thus the larger a desired cluster state is the less likely it is to be created in any one attempt. This is a result of the entangling operation and not the device itself per say as no photonic entangling operation can be performed with success rate equal to one. The present invention will create a linear cluster state numerically identical to the industry standard parallel method but arranges the qubits as a periodic sequence (with a constant period T) in a single optical mode. Any two qubit entangling operation can be used in place of the CZ gate; however such gates may produce different cluster states.

In order to change the linear cluster state into a two dimensional cluster state, the preferred embodiment loops back selected qubits from the linear cluster state so that they may be entangled with another qubit in the chain. For the discussion below the focus is on the application of creating ring shaped clusters states. The present invention is not limited to only ring cluster states and other outputs are feasible. To create the ring in the preferred embodiment it "loops" the first and only the first qubit from the front of the linear cluster state chain to the back of the chain and entangle it with the last qubit to close the ring.

The large loop back may be fabricated as a static delay line such as a polarization maintaining waveguide meander or a fiber delay line, as is shown in an alternate formulation. The preferred embodiment is a more versatile device which incorporates a variable delay in this loop. The preferred implementation uses such a series of polarization maintaining waveguide meander delays of differing size. The present invention uses a series of waveguide meanders due to the ease of their fabrication and stability, however any device with variable single photon storage time such as, but not limited to, a toroidal ring resonator, a trapped ion system or a cold atomic gas cell represent trivial modifications. The advantage of a variable delay is that a single device can create rings of different sizes simply by changing the length of the delay in multiples of the input period T.

Such ring shaped clusters have a variety of uses. A 4 qubit ring (or square) cluster state was used to implement Grover's search of 4 logical elements in the MBQC basis, the largest all optical implementation of the algorithm to date. A six qubit, hexagonal ring, was used with additional qubits to simulate a benzene molecule in an application of quantum chemistry.

BRIEF DESCRIPTION OF THE DRAWINGS

All figures are schematic and therefor said to be "not to scale".

FIG. 1 depicts an integrated waveguide circuit consisting of multimode interferometers to act as controllable switches, delay lines, off chip electronics and two 2 qubit entangling gates. Such a device can probabilistically create one dimensional linear and 2 dimensional ring shaped cluster states (among others) given an input of sequentially spaced qubits in a single input and a single output mode.

DETAILED DESCRIPTION OF THE PREFERRED EMBODIMENT

Referring to FIG. 1 shows the full integrated waveguide (IW) chip 10. The input to the device is an evenly spaced sequence of photons with period T. Such photons can be created from the source of Mower and Englund (WO2013009946A1) or other sources. The photons enter the chip 10 via the input port 20. The preferred integrated waveguide chip 10 is a single large monolithic chip of Lithium Niobate ($LiNbO_3$). The input port 20 is a polarization maintaining optical waveguide fabricated in the chip 10. Polarization maintaining waveguides are required as we chose to encode our qubits in the polarization modes of each photon. Thus the resource of periodic photons must also be in a known polarization state. It is then trivial to rotate the input state polarization state to any desired state via a polarization controller 30. The preferred implementation uses integrated waveguide based polarization controllers 30 which function via the electro-optical effect. Such rotations could take place prior to the photons entering the chip but for generality and controllability we rotate the polarizations on chip. The preferred embodiment rotates the incoming photons at 30 to the plus state (equal superposition of horizontal and vertical polarization, H+V up to normalizations). The photons then enter through one of two ports in a polarization maintaining multimode interferometer (MMI) 40. All such interferometers are integrated on chip 10 and consist of a multimode slab of the waveguide material similar to that described by Soldano and Pennings (J. of Lightwave Tech. Vol. 13 No. 4, 1995). The switching and coupling effect of such MMI's 40 is depended on their geometry and the index change induced via the electro-optic effect. The fabrication and operation of MMIs is well known in the state of the art. The preferred embodiment has different species of MMIs (such as 1 by 2, 2 by 2 and 2 by 1 MMIs) however note that the device could be trivially redesigned with identical MMIs in which unused ports were simply bulk terminated. The MMI 40 is electro optically controlled and can deterministically route photons to either of its output modes 50 and 60. Initially the MMI 40 will pass photons into mode 50. The MMI 40 is controlled via logical control line 70 by off chip electronics 80. The off chip electronics 80 receives a clock signal 90 in order to synchronize all of its operations with the periodic input. MMI 40 sends the first and only the first photon into its "upper" output mode 50 and all subsequent photons into its "lower" mode 60. By "upper" and "lower" we refer to the schematic layout of FIG. 1 and not to a design feature. "Upper" mode 50 enters a waveguide meander delay 100. The length of the waveguide meander delay 100 is fabricated such that it is exactly one period of the sequence of the input photons. Thus in this implementation the period T must be a predetermined constant known before fabrication regardless of the number of photons used in any given instance. A variable storage length device could be used in place of 100 and if all such delays are replaced with variable delays then there would be some flexibility in the period of the input photons. The photon in 100 is then incident on MMI 110 which is set by logical control line 120.

The second photon which enters the device is sent to the "lower" mode 60 by MMI 40. The length of the delay line 110 and modes 50 and 60 are fabricated such that the two photons are simultaneously incident on the paired MMIs 110. The MMIs 110 are considered paired because they act in tandem to either direct the photons into the entangling operation 130 or into the bypass lines 140. The entangling operation 130 in the preferred embodiment is the CZ gate of Crespi et. al (WO2012150568A1). This gate is implemented in waveguides as several static evanescent couplers. The gate is probabilistic with a success rate of $1/9$ and requires four modes two of which enter as vacuum. After passing through either the entangling operation 130 or the bypass lines 140, which must be fabricated to be the exact same length (i.e. to maintain synchronization), the photons are incident on another set of MMIs.

MMI 150 is in the "upper" path. MMI 160 is in the "lower" path. These MMIs are controlled by the set of logical control lines 170. MMI 160 always acts to channel its incident photons from the CZ gate 130 or the by-pass 140 line to MMI 180. MMI 150 is more important as it takes input photons and channels them into the "loop back" feature 190 or to the MMI 180. A successful application of the CZ gate will produce one photon in each output, and thus one photon in both MMIs 150 and 160 (equivalently use of the bypass lines 140 will do the same). MMI 150 then feeds one photon into the loopback line 190. The other photon is channeled by MMI 160 into MMI 180.

The loop back 190 is in essence a delay line and may require an additional meander 200. The photon in this mode then enters MMI 110 in the "upper" mode. The length of 190 and 200 are determined prior to fabrication such that a photon which enters 190 will be incident on the paired MMIs 110 in the "upper" mode at the same time that the next photon in the sequence reaches the paired MMIs 110 in the "lower" mode. In other words the "looped back" photon is held for one period until it is synchronized with the next photon in the sequence. Thus the CZ gate 130 which acts on simultaneously incident qubits is made to act on sequential qubits in a "single" mode.

This process then repeats to create a chain of arbitrary length, assuming the CZ gate succeeds each time. In the event that the CZ gate 130 fails, the desired cluster state will not be created. Other mechanisms such as photon loss will also cause a failure. Such a failure can be trivially detected via post selection by the absence of a photon from the sequence.

Simultaneously the photons from the "lower" mode which exits MMI 160 is incident on MMI 2800. This MMI 280 controls access to the larger "loop back" path 250 or the output mode 260 and is controlled via logical control line 270 and electronics 80. This larger "loop back" allows for photons from one part of the chain to be delayed so that they may be entangled with another part of the chain. This can be considered a multi-dimensional cluster state output or a not-nearest neighbor one dimensional cluster state.

As an example the creation of a ring shaped cluster state is described next. To create a ring shaped cluster state MMI 180 channels the first photon it receives into a larger delay line 220. The length of the delay line is fabricated such that it is a specific multiple of the period of the input sequence of photons T. This delay length sets the size of the ring. MMI 180 then sends all subsequent photons to MMI 230 which is controlled via 240. MMI 230 controls access to an entangling operation 250 or a by-pass line 260 similar to MMIs 110. Initially all photons incident on MMI 230 enter the by-pass line 260 avoiding the entangling operation and are channeled out of the device by MMIs 270 and 280. The last photon in the chain is sent to the entangling operation 250 by MMI 230. The last photon in the chain enters one port of the CZ gate 250 at exactly the same time as the first photon exits delay 220 and enters the other port of the CZ gate 250. Thus the first and last qubits may be entangled completing the ring cluster state. One photon then enters a delay 300 of one period T. This allows the other photon time to exit the chip 10 and maintains the periodicity between the photons. The other photon exits the chip 10 similar to the previous photons by first entering MMI 270 which behaves similar to MMI 160 and is set by logical control line 290 such that incident photons from either the CZ 250 gate or the by-pass line 260 are diverted to its only output. That output enters MMI 280 which behaves similarly to 180 and is controlled by logical control line 310 such that all incident photons are sent to the chips 10 output mode 320.

What is claimed is:

1. An apparatus for sequentially entangling photons in two dimensions, comprising:
   a waveguide chip having integrated optical components and interconnecting optical waveguide disposed therein, wherein said optical components further comprise
   an input port connected to said optical waveguide for inputting photons into said waveguide chip;
   a polarization controller connected to said input port fir rotating the polarization of photons received via said input port;
   a plurality of delay lines for synchronizing said photons in time;
   a plurality of multimode interferometers for selectably routing said photons through any of said interconnecting optical waveguide;
   a controller for switching an input mode of any of said plurality of multimode interferometers so as to route said photons into and out of a selected interferometer's input and output ports;
   a clock source for synchronizing said controller with the arrival of said photons;
   a plurality of entangling gates having bypass and entangling inputs and bypass and entangling outputs for selectively entangling said photons; and
   an output port for routing said entangled photons out of said waveguide chip.

2. The apparatus of claim 1, wherein said polarization controller rotates the polarization of said photons to a plus state.

3. The apparatus of claim 1, wherein each of said plurality of multimode interferometers comprises a slab of material configured as a multimode optical waveguide.

4. The apparatus of claim 1, wherein a first of said plurality of said delay lines has a length chosen to provide a delay equal to the period of a periodic sequence of said photons.

5. The apparatus of claim 1, wherein a first of said plurality of multimode interferometers synchronizes photons by routing a photon through a first output into said first of said plurality of delay lines and routing a next photon through a second output which bypasses said first of said plurality of delay lines.

6. The apparatus of claim 1, wherein a second of said plurality of multimode interferometers, has as a first of two inputs, the output of said first delay line.

7. The apparatus of claim 1, wherein said second and a third of said plurality of said multimode interferometers are arranged in parallel, wherein
   said third multimode interferometer has as an input the non-delayed output of said first multitude interferometer, and wherein said second and said third multimode interferometers each have a first output connected to a bypass input and a second output connected to an entangling input of a first of said entangling gates.

8. The apparatus of claim 7, wherein a fourth and a fifth of said plurality of said multimode interferometers are arranged in parallel, said fourth and fifth multimode interferometers each having a first input connected to an entangling output of said first entangling gate and a second input connected to a bypass output of said first entangling gate;
   said fourth and fifth multimode interferometers each having a first output connected to an input of a sixth of said plurality of said multimode interferometers; and
   said fourth multimode interferometer having a second output connected to an input of a second of said plurality of delay lines.

9. The apparatus of claim 8, wherein said second of said plurality of said delay lines has an output connected to a second of said two inputs of said second multimode interferometer.

10. The apparatus of claim 9, wherein said sixth of said plurality of said multimode interferometers has
   a first output connected to an input of a third of said plurality of delay lines; and
   a second output connected to an input of a seventh of said plurality of multimode interferometers.

11. The apparatus of claim 10, wherein said seventh of said plurality of multimode interferometers has
   a first output connected to a second input of a second of said plurality of entangling gates; and
   a second output connected to a second input of an eighth of said plurality of multimode interferometers.

12. The apparatus of claim 11, wherein said second of said plurality of entangling gates has
   a first input connected to an output of said third of said plurality of delay lines;
   a first output connected to an input of a fourth of said plurality of delay lines; and
   a second output connected to a first input of said eighth of said multimode interferometers.

13. The apparatus of claim 12, wherein said fourth of said plurality of multimode interferometers has an output connected to a first input of a ninth of said plurality of multimode interferometers.

14. The apparatus of claim 13, wherein said ninth of said plurality of multimode interferometers has
   a second input connected to an output of said eighth of said plurality of multimode interferometers; and
   an output connected to said output port.

\* \* \* \* \*